(12) United States Patent
Joseph

(10) Patent No.: US 7,883,425 B2
(45) Date of Patent: Feb. 8, 2011

(54) FLOORING SYSTEM

(75) Inventor: Daniel M. Joseph, Los Angeles, CA (US)

(73) Assignee: Disney Enterprises, Inc., Burbank, CA (US)

( * ) Notice: Subject to any disclaimer, the term of this patent is extended or adjusted under 35 U.S.C. 154(b) by 473 days.

(21) Appl. No.: 12/018,606

(22) Filed: Jan. 23, 2008

(65) Prior Publication Data
US 2009/0186710 A1 Jul. 23, 2009

(51) Int. Cl.
A63C 19/10 (2006.01)
A63C 19/12 (2006.01)

(52) U.S. Cl. .......................................... 472/88; 472/92

(58) Field of Classification Search ............. 472/88–92, 472/136; 428/95, 178
See application file for complete search history.

(56) References Cited
U.S. PATENT DOCUMENTS

| | | | |
|---|---|---|---|
| 3,020,811 A | 2/1962 | Lincoln et al | |
| 3,350,092 A | 10/1967 | Maki | |
| 3,443,492 A | 5/1969 | Pleass | |
| 3,736,847 A | 6/1973 | Hickey | |
| 5,049,079 A | 9/1991 | Furtado et al. | |
| 5,412,090 A | 5/1995 | Bendiner | |
| 5,851,626 A * | 12/1998 | McCorry et al. | 428/95 |
| 5,886,083 A | 3/1999 | Mackey | |
| 6,258,871 B1 | 7/2001 | Brown, III | |
| 6,455,113 B1 | 9/2002 | Bilodeau | |

* cited by examiner

*Primary Examiner*—Kien T Nguyen
(74) *Attorney, Agent, or Firm*—Marsh Fischmann & Breyfogle LLP; Kent A. Lembke; Karl Dierenbach

(57) ABSTRACT

A floor system for simulating a natural environment, such as snow, is disclosed. The system includes a confinement member that holds an aggregate. The confinement member may be positioned between a pair of disturbing agent layers comprising meshes that contact the confinement member at a plurality of discrete points. Force applied to the floor system by a user walking across the system results in force being communicated to the confinement member through the disturbing agent layers through the plurality of discrete contact points. The force applied at each of the discrete contact points causes portions of the aggregate proximate to the contact points to shift, resulting in vibrations and sounds that simulate the sound and feel of walking on snow. Additional layers for support, durability, and comfort may also be included in the floor system.

21 Claims, 3 Drawing Sheets

FLOORING SYSTEM

BACKGROUND OF THE INVENTION

1. Field of the Invention

The present invention relates, in general, to flooring systems, and, more particularly, to systems and methods for providing a floor that simulates features of natural surfaces such as the sound and feel of footsteps on snow.

2. Relevant Background

It has often been desirable to create the illusion that a particular room or area possesses the attributes of a particular natural setting. For example, sand may be brought into an area to help simulate a beach or desert setting. In another example, artificial snow may be laid down to help simulate a winter or polar setting.

Such illusions may be created for a variety of reasons. For example, a retail establishment may simulate a winter environment to attract customers. The simulated winter environment may be part of a themed event such as a "Christmas in July" sale, a preseason winter clothing sale, or a "beat the heat" sale. In such cases the retail establishment may wish to create the illusion of snow covering a particular area. In another example, parties or other special events may have a winter theme and, as such, the planners may desire to simulate a winter environment where the party or event is to be held. In another example, an entertainment venue, such as a theme park, may wish to simulate a winter environment to attract patrons. For example, a theme park ride with a winter or polar theme may wish to simulate a winter environment within the ride itself and in the surrounding area.

Prior methods of simulating a winter environment fall generally into two areas: using artificial snow produced through a process that requires freezing of the artificial snow and using artificial snow that does not require freezing. The former methods generally include spraying or pumping a water or water-based mixture into a cold air stream, where the cold air stream freezes the mixture and distributes the frozen particles. This method is particularly well-suited for large-area outdoor applications in cold weather. This is the method that may be used to spread artificial snow over a ski slope. For indoor applications, this method is generally impractical since the indoor space must generally be kept at a very low temperature to prevent the artificial snow from melting.

Artificial snow that does not require freezing generally consists of disbursed particulates that may convey the illusion of snow. Generally, this may be achieved by scattering white flocking, chips, sand or other particulates in the desired area. Such methods may create a granular sensation under the feet of users walking through the area. The scattered particulates may also give the appearance of snow.

The above-described known methods of simulating snow have several limitations. For artificial snow produced through a process requiring freezing, the largest limitation is that such artificial snow may only be used effectively in cold (e.g., refrigerated) environments. Other issues include maintenance of such surfaces, which may be damaged or rendered aesthetically unpleasing by foot traffic over the surfaces. In addition such surfaces may be extremely slippery and present safety issues to users walking across the surfaces.

Several limitations and issues also exist for artificial snow that does not require freezing. Foot traffic over an area covered with such artificial snow may cause the artificial snow to be redistributed in undesirable patterns. For example, foot traffic may push away the artificial snow from high-traffic areas exposing the surface below. In this regard, such artificial snow use may require frequent maintenance in the form of redistributing the scattered granules (e.g. by sweeping or blowing). Also, loose artificial snow scattered about an area may present an unsafe environment in that the loose granules may be a trip and slip hazard. Additionally, dirt or other unwanted contaminants may fall into and/or intermix with the artificial snow. This may reduce the effectiveness of the illusion of clean, white snow and also may be problematic to correct. Such contaminants may require the replacement of the contaminated artificial snow with uncontaminated artificial snow, requiring additional materials and labor.

SUMMARY OF THE INVENTION

Embodiments of the present invention address the above-described issues by providing an artificial flooring system that does not include unconstrained disbursed particulates. Furthermore, in embodiments where the artificial flooring system is used to simulate a snow-covered floor, below freezing temperatures are not required to maintain the artificial flooring system.

For example, an artificial flooring system is described that comprises a series of laminates which when packaged and stacked together in a specific order give the illusion of walking on a particular type of surface. The artificial flooring systems described herein may be used to simulate a snow-covered floor. Such a "snow floor" may simulate the look, feel (e.g., the mechanical response of the flooring to a step of a person walking on the flooring system), and sound (e.g., the audible response of the flooring to a step of a person walking on the flooring system) of a snow-covered surface.

The top surface of such a snow floor may be free from loose particulates. In this manner, embodiments of the snow floor described herein may overcome the issues described above with respect to loose particulates, such as trip hazards, high maintenance, and degradation of appearance. Furthermore, no refrigeration is required to maintain the embodiments of the snow floor described herein.

In this manner, a durable, safe, low maintenance flooring system is provided. The top surface of such a flooring system may be provided in a variety of colors and textures to simulate the look of a variety of surfaces (e.g., snow, sand, dirt). Furthermore, internal attributes of the flooring system may be tuned to simulate the feel and sound of a variety of natural and other surfaces.

In one aspect, a flooring system comprises a first layer that includes an aggregate that is confined within a confinement member and a second layer interconnected to the confinement member. As a user walking on the flooring system steps on to the flooring system, the aggregate, confined within the confinement member, may be shifted such that portions of the aggregate move relative to other portions of the aggregate resulting in adjacent components of the aggregate rubbing against each other. This relative movement of portions of the aggregate may produce a particular sound and vibration that is similar to a known surface, such as a snow packed surface. As used herein, the term "aggregate" includes material that may include a plurality of individual components (e.g., particles and/or granules). The aggregate may comprise a single type of material or a plurality of different types of materials. The individual components of the aggregate may be uniformly sized or of varying sizes. Any layer between the user and the confinement member may be capable of allowing sound and/or vibrations to pass therethrough, allowing the sounds and/or vibrations to be communicated to the user.

In an embodiment, the aggregate may comprise a blasting media, such as a plastic blasting media. The plastic blasting media may comprise 12-16 mesh polypropylene granules. In an embodiment, the confinement member may include a plurality of tubes, wherein the aggregate is confined within the plurality of tubes. The tubes may be interwoven with each other.

In an embodiment of the current aspect, the second layer may be an outer layer of the flooring system. The outer layer may be the top layer of the flooring system. In such an embodiment, the outer layer may be subjected to contact with users walking across the flooring system. The color and texture of the outer layer may be selected to give the appearance of a particular surface, such as snow. Accordingly, where a snow surface is to be simulated by the flooring system, the outer layer may comprise a continuous layer of durable white felt.

In an embodiment, the second layer may be a first disturbing agent layer. The first disturbing agent layer may be operable to communicate a force applied to the flooring system over a predetermined area to the confinement member at a plurality of discrete locations. The flooring system may further include an outer layer, wherein the first disturbing agent layer is disposed between the confinement member and the outer layer. The outer layer may, for example, be similarly configured as the above-described outer layer. The flooring system may further include a force distribution layer. The force distribution layer may be disposed between the outer layer and the first disturbing agent layer. The force distribution layer may be substantially flat, and may be operable to distribute the force applied to the flooring system over a predetermined area to an area of the first disturbing agent layer larger than the predetermined area. In this regard, a step of a user may produce a downward force on the flooring system over a first area corresponding to the area of the user in contact with the flooring system. The downward force may be distributed by the force distribution layer over a second area larger than the first area. The force may be distributed over the first disturbing agent layer and press the first distribution layer into the confinement member. The first disturbing agent layer may be in contact with the confinement member in a plurality of discrete locations, therefore the force applied by the user may be translated into the confinement member through a portion of the plurality of discrete locations.

In an embodiment, the second layer may be a first disturbing agent layer and the flooring system may include first and second disturbing agent layers. The first and second disturbing agent layers may be disposed on top of and below the confinement member and may be in contact with the confinement member at a plurality of discrete locations. Such an embodiment may include an outer layer and/or a force distribution layer as described above.

In an arrangement, the flooring system may include a padding layer. The padding layer may be disposed such that when installed, the padding layer is below the confinement member. The first or second disturbing agent layer may be disposed between the padding layer and the confinement member.

In an arrangement, the flooring system may include a base layer. The base layer may be a rigid layer. The base layer may be disposed such that when installed, the base layer is below the confinement member. The base layer may be a pre-existing layer, such as a typical floor on which the other layers may be installed. Alternatively, the base layer may be a panel (e.g., similar to a tile) to which the other layers are attached.

In another aspect, a flooring system is provided that includes an aggregate, a confinement member, a continuous outer layer, a first disturbing agent layer, a second disturbing agent layer, a force distribution layer, and a padding layer. The aggregate may comprise 12-16 mesh polypropylene granules. The confinement member may include a plurality of tubes, wherein the aggregate is confined within the plurality of tubes. The first and second disturbing agent layers and the force distribution layer may be configured similarly to the disturbing agent layers and the force distribution layer described above. The aggregate may be confined within the confinement member. The first disturbing agent layer may be disposed between the confinement member and the outer layer. The force distribution layer may be disposed between the first disturbing agent layer and the outer layer. The second disturbing agent layer may be disposed on an opposite side of the confinement member from the first disturbing agent layer. The second disturbing agent layer may be disposed between the confinement member and the padding layer.

Any of the above embodiments, features and arrangements of any of the above aspects may be combined with any other embodiments, features and arrangements as disclosed herein as appropriate. Any of the disturbing agent layers described herein may be a mesh.

In still another aspect, a method of simulating the reaction of snow to a step of a user is provided. The method may include providing a white top layer of a flooring system, receiving the step of the user on the flooring system over a first contact area between the user and the flooring system, redistributing a force applied to the flooring system by the step over an area larger than the first contact area, communicating the redistributed force to a plurality of discrete locations within a confinement member, and repositioning an aggregate confined within the confinement member as a result of the communicated force. The repositioning of the aggregate may include relative movement of individual components of the aggregate relative to other individual components of the aggregate. The relative movement may produce sound and/or vibrations that may be transmitted to the user. The sounds and/or vibrations may simulate sounds and/or vibrations associated with walking on snow or other surfaces.

DETAILED DESCRIPTION OF THE PREFERRED EMBODIMENTS

Figure 1:
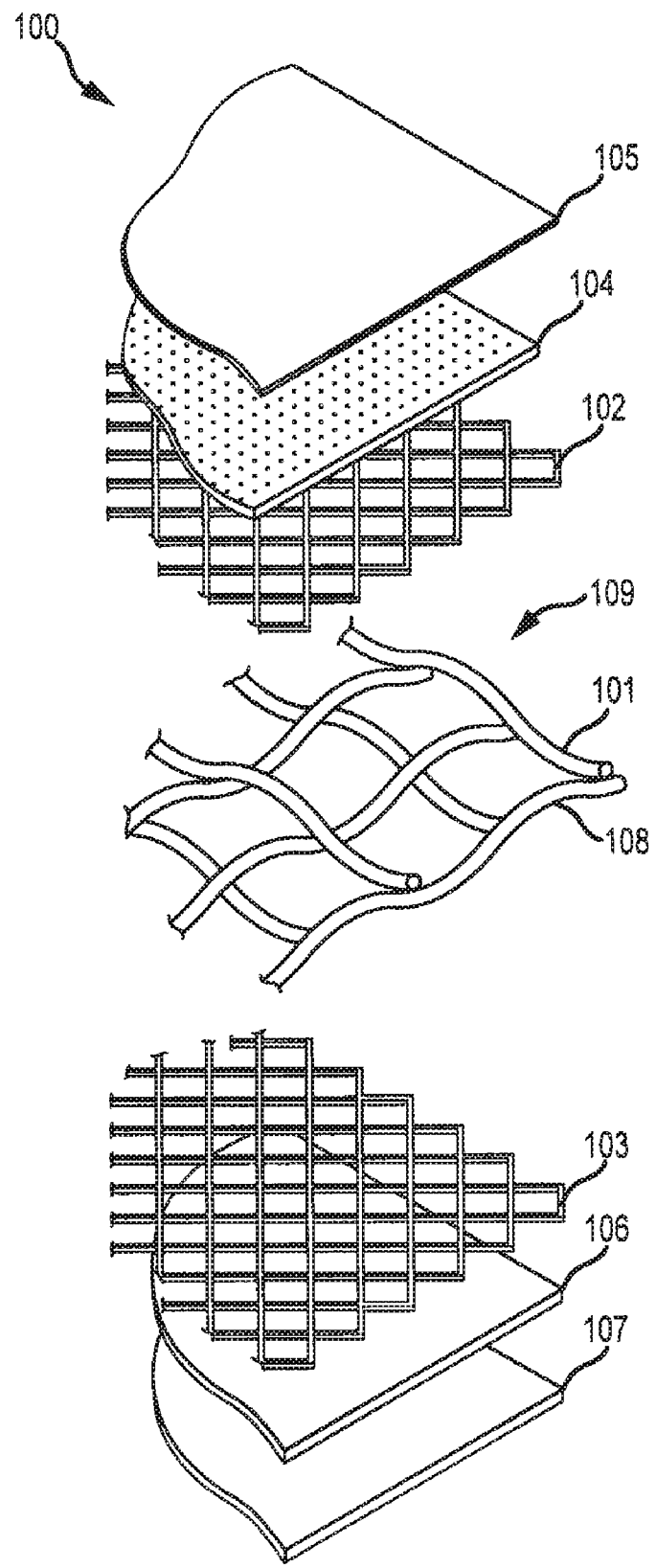
FIG. 1 is an exploded view of an embodiment of a snow floor.

Briefly, embodiments of the present invention are directed to flooring systems and related methods. Particularly, the present invention provides a flooring system capable of simulating natural and other environments. For example, systems and methods disclosed herein may be operable to produce a flooring system that simulates aspects of the look, feel (e.g., the mechanical response of the flooring to a step of a person walking on the flooring system), and sound (e.g., the audible response of the flooring to a step of a person walking on the flooring system) of a snow-covered surface.

For example, a flooring surface that helps to create the illusion of walking in snow may be a part of an attraction simulating a winter environment for entertainment purposes (e.g., at an amusement park). The illusion of a winter setting, including the present flooring system, may also be used as a sales tool. For example, an area of a retail store may simulate a winter environment to attract interest in winter clothing and/or ski equipment. Another use may include theatrical stages that simulate a winter scene. Those skilled in the art will recognize that many other uses exist for a durable, safe, and low maintenance flooring system capable of simulating aspects of the look, feel, and sound of walking on snow.

Other surfaces aside from snow may also be simulated using the apparatuses and methods disclosed herein. For example, the feel of walking in sand or dirt may be simulated.

The flooring systems described herein have several advantages over existing systems. For example, many existing systems comprise loose particles spread about over a predetermined area. This presents many problems including containment of the particles within the predetermined area and maintenance of an even distribution of particles within the predetermined area. Such systems may require frequent redistribution of the particles (e.g., through sweeping or blowing operations) to maintain an acceptable particle distribution. Furthermore, loose particles may be a trip hazard for people walking through the loose particles. Additionally, dirt or other foreign material may fall in with the particles and may be difficult to remove, possibly requiring replacement of all of the particles.

Other known systems produce artificial snow by injecting water droplets into a cold air stream. Although such systems may be useful for producing artificial snow for ski slopes, such systems are impractical for indoor use or use where the ambient temperature is above freezing.

In contrast, and as discussed in detail below, embodiments of the flooring systems described herein may be configured to simulate aspects of the look, feel and sound of a snow-covered surface without the above discussed disadvantages of prior techniques. Embodiments described herein do not contain loose particles spread on a top surface of a floor and no undesirable redistribution of particles occurs during use. Accordingly, no corresponding respreading (e.g., through sweeping or blowing operations) of particles is required. Also, since embodiments described herein include a continuous top surface, dirt that falls onto the surface may be cleaned using conventional carpet cleaning methods (e.g., vacuuming). The continuous top surface may also provide adequate grip and a substantially flat top surface for persons walking on the surface. Furthermore, no refrigeration is necessary to maintain the condition of the embodiments described herein.

Although generally discussed herein in terms of a snow floor operable to simulate aspects of the look, feel, and sound of snow, embodiments of the flooring systems described herein may simulate other surfaces. For example, aspects of the look, feel, and sound of sand or dirt surfaces may be simulated.

FIG. 1 is an exploded diagram of an embodiment of a floor system in the form of a snow floor 100. The snow floor 100 of FIG. 1 is oriented with a top layer 105 disposed on the top of the snow floor 100 and a base 107 disposed at the bottom of the snow floor 100. In this regard, the snow floor 100 may be intended to be installed such that the top layer 105 is visible and may be contacted by users walking across the snow floor 100, while the remaining layers remain hidden from the user below the top layer 105. The top layer 105 and the base 107 are discussed in detail below.

Figure 2:
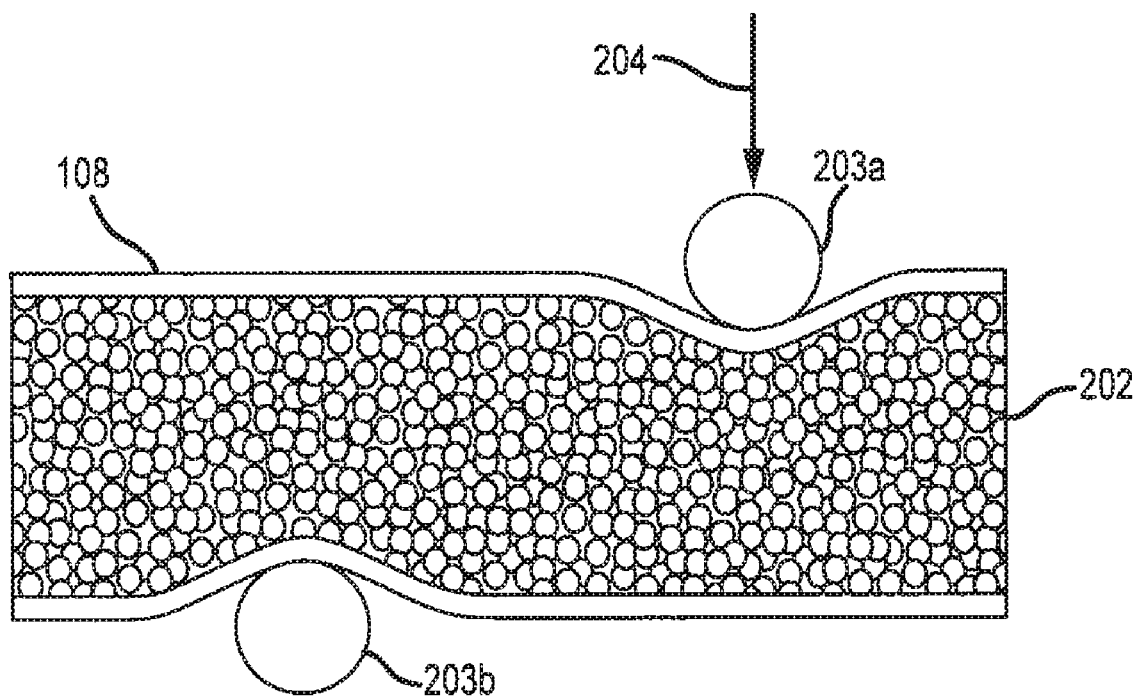
FIG. 2 is a cross sectional schematic view of a section of a confinement member and upper and lower disturbing agent layers of the embodiment of FIG. 1.

Within the snow floor 100 is a confinement member 101 that confines an aggregate (not visible in FIG. 1). FIG. 2 is a schematic diagram of a longitudinal cross-section of a portion (along a tube 108) of the confinement member 101 of FIG. 1. Generally, as illustrated in FIG. 2, the confinement member 101 surrounds and confines an aggregate 202. When force 204 is applied to a discrete portion of the confinement member 101, a portion of the confinement member 101 may be displaced and the aggregate 202 in and around the area of displacement may be displaced, resulting in portions of the aggregate 202 moving relative to other portions of the aggregate 202 resulting in adjacent components of the aggregate 202 rubbing against each other. The movement of the aggregate 202 may produce noise and vibration. Such noise and vibration may be transmitted to a user walking across the snow floor 100. Various parameters of the snow floor 100 discussed below may be altered to change the profile of the noise and vibration produced by the user walking across the snow floor 100.

The confinement member 101 may comprise a single compartment or a plurality of discrete compartments. The confinement member 101 may comprise a matrix of interconnected structures where the interior portions of the structures are interconnected to form a single continuous interior space. In embodiments where the confinement member 101 comprises a plurality of discrete compartments, the discrete compartments may be in any appropriate form. The interior of the confinement member 101 may be filled with the aggregate 202.

The confinement member 101 illustrated in FIG. 1 is in the form of a network of tubes 109 comprised of individual tubes such as the tube 108. The tubes 109 may be in the form of a matrix of tubes 109 where the matrix of tubes 109 contains a single continuous interconnected interior compartment (e.g., where the tubes 109 intersect, the interior portions of the tubes 109 may also be connected). The tubes 109 may be periodically closed off to create individual compartments within the matrix of tubes 109. The tubes 109 may be round or any other appropriate shape.

The network of tubes 109 may comprise a plurality of individual tubes with interior spaces distinct from other tubes. Each individual tube may be periodically closed off to create individual compartments of that tube.

As illustrated in FIG. 1, the tubes 109 may be arranged in a pattern with a first portion oriented along a first direction and a second portion oriented in a second direction. As shown, the first direction is perpendicular to the second direction, however it will be appreciated that other arrangements of the tubes 109 may be utilized. In addition, the pattern of tubes 109 may be interwoven (e.g., individual tubes such as tube the 108 may be interlaced in a manner similar to a woven fabric).

As noted, the properties of the tubes 109 may contribute to a particular noise and vibration profile produced by a user walking across the snow floor 100. The tubes 109 may be configured to provide appropriate flexibility to allow the force from a user walking across the snow floor 100 to be communicated through the tube wall to the aggregate 202 causing the aggregate 202 to shift and produce the desired noise and vibration profile. The tubes 109 may also be configured (e.g., inner diameter, outer diameter, material) to adequately communicate the noise and vibration of the moving aggregate 202 up to the user. The tubes 109 may also be configured to provide adequate strength and flexibility to withstand repeated applications of force (e.g. from many users walking across the snow floor 100).

In a particular arrangement, the tubes 109 may comprise silicone. In a particular arrangement, the tubes 109 may be about ½" in diameter. The tubes 109 may be arranged in a grid pattern (as illustrated in FIG. 1) with parallel sections of tubing disposed about 4 inches apart (e.g., each square in the confinement member 101 illustrated in FIG. 1 may measure about four inches on each side). This arrangement coupled with the remaining components of the snow floor 100 discussed below, may be operable to reproduce the look, feel and sound of snow to a user walking across the snow floor 100.

In another embodiment, the confinement member 101 may be constructed from two separate sheets of material that are subsequently fixedly interconnected. For example, separate sheets may be fixedly interconnected by welding (e.g., heat welding, ultrasonic welding). The aggregate 202 may be disposed between the two separate sheets of material and the welding process may then capture the aggregate 202 between the two sheets. Any appropriate welding pattern may be used. For example, a welding pattern may be employed that simulates the interior compartments of the tubes 109 of FIG. 1.

The aggregate 202 comprises a plurality of individual components. The configuration of the aggregate 202 may be selected such that the individual components of the aggregate 202 remain substantially undamaged by the application of force (e.g., users walking across the snow floor) to the confinement member 101. This is beneficial since if the components tended to break up as a result of the application of force to the confinement member 101, the feel and sound produced by the application of force to the confinement member 101 may change over time as the size and shape of the individual components change. Accordingly, desired traits of the aggregate 202 may include sufficient strength to withstand the forces expected to be exerted on the aggregate 202, and the ability to produce a specific profile of noise and vibration (e.g., a profile of noise and vibration the simulates walking on snow) in reaction to the expected forces.

In a particular arrangement, the aggregate 202 may comprise polypropylene granules. The aggregate 202 may comprise a 12-16 mesh plastic blasting media. 12-16 Mesh corresponds to particle sizes from about 1.7 millimeters to about 1.18 millimeters. Polypropylene granules may be particularly well suited for use as the aggregate 202 due to the combination of a relatively high durometer hardness and a relatively low coefficient of friction. This combination may result in the individual polypropylene granules sliding relative to each other without breaking into smaller pieces over time. This may result in a long usable life for the aggregate 202 in particular, and for the entire snow floor 100 system in general.

The snow floor 100 may include at least one disturbing agent layer, such as a first disturbing agent layer 102. The first disturbing agent layer 102 may be disposed to be in contact with the confinement member 101. As illustrated in FIG. 1, the first disturbing agent layer 102 may be disposed on top of the confinement member 101. The first disturbing agent layer 102 may be configured such that it does not contact the confinement member 101 along a continuous portion of the confinement member 101. In this regard, portions of the first disturbing agent layer 102 may contact the confinement member 101 at a plurality of discrete locations. By contacting the confinement member 101 at a plurality of discrete locations, the first disturbing agent layer 102 may redistribute and concentrate forces applied to the snow floor 100 (e.g., from a foot step of a user) to the plurality of discrete locations within the confinement member 101. Forces applied to the snow floor 100 may be over a predetermined area, such as the area of contact between a shoe of a user and the floor. The redistribution effect is illustrated in FIG. 2. FIG. 2 is a partial cross sectional view of a portion of the confinement member 101 that contains aggregate 202 confined within the confinement member 101, FIG. 2 further illustrates a portion of the first disturbing agent layer 203a in contact with and being pressed into the confinement member 101 by a force 204 at a discrete location. The aggregate 202 in the vicinity of the discrete location, as described above, may be disturbed and produce a particular profile of noise and vibration.

Without the first disturbing agent layer 102, a footstep on the snow floor 100 may be distributed evenly across the confinement member 101, which may result in relatively less movement of components of the aggregate 202 relative to other components of the aggregate 202.

In a particular arrangement, the first disturbing agent layer 102 may comprise a mesh (e.g., a polyethylene plastic mesh). Portions of the mesh may contact and interact with the confinement member 101 at a plurality of discrete locations. In this regard, a uniform downward force applied to the mesh of the first disturbing agent layer 102 may result in the applied force being distributed to the confinement member 101 at the plurality of discrete locations. At each discrete location, a portion of the mesh may be in contact with, and communicate a portion of the applied force to, the confinement member 101. One such discrete location is shown in FIG. 2 where the force 204 is applied to the confinement member 101.

As discussed above with reference to the confinement member 101 and the aggregate 202, the configuration of the first disturbing agent layer 102 may affect the profile of noise and vibration produced when a user steps on the snow floor 100. Accordingly, the size of the mesh of the first disturbing agent layer 102 (e.g., opening size), the hardness of the first disturbing agent layer 102, and the size of individual portions of the mesh of the first disturbing agent layer 102 (e.g., such as portion 203a) may affect the noise and vibration profile. The orientation of the mesh relative to the confinement member 101 may be such that the individual strands of the mesh lay diagonally across individual tubes such as tube 108. Other orientations may be employed. Also, the orientation of the mesh relative to the confinement member 101 may be uncontrolled.

The snow floor 100 may include a second disturbing agent layer 103. The second disturbing agent layer 103 may be configured similar to the first disturbing agent layer 102. As illustrated in FIG. 1, the second disturbing agent layer 103 may be disposed below the confinement member 101. In this regard, portions of the first disturbing agent layer 102 and second disturbing agent layer 103 may both cause movement of the aggregate 202 within the confinement member 101 at a plurality of discrete locations in reaction to a footstep on the snow floor 100. As illustrated in FIG. 2, as a force 204 is applied to a portion of the confinement member 101, the confinement member 101 may be pressed over a portion of the second disturbing agent layer 203b, resulting in relative movement of the aggregate 202 in the area proximate to the portion 203b. The snow floor 100 may include both the first disturbing agent layer 102 and the second disturbing agent layer 103, or the snow floor 100 may include a single disturbing agent layer; either the first disturbing agent layer 102 or the second disturbing agent layer 103. The first and second disturbing agent layers 112, 103 may be similarly configured (e.g., same material and mesh size) or they may be configured differently from each other. The first and second disturbing agent layers 102, 103 may be disposed such that portions of the layers that contact the confinement member 101 are intentionally misaligned as illustrated in FIG. 2, intentionally aligned, or partially aligned. Alternatively, the first and second disturbing agent layers 102, 103 may be assembled into the snow floor 100 without regard to their precise positioning relative to each other.

As previously noted, the confinement member 101 may comprise a plurality of tubes 109 and the first and second disturbing agent layers 102, 103 may comprise meshes. As such, together the confinement member 101 and the first and second disturbing agent layers 102, 103 may provide an uneven surface. The mesh itself may be uneven in that, as a mesh it will have a plurality of gaps on its surface, and the entire mesh may rise and fall as it passes over the various portions of the confinement member 101. The uneven surface may be undesirable for aesthetic and/or safety reasons. Also, as users walk across the snow floor 100, the distribution or force from each of the footsteps may be momentarily concentrated. For example, during a step, a heel of the user may come into contact with the snow floor 100. Where the heel comes into contact with of the snow floor 100, the weight of the user may be momentarily concentrated over a relatively small area. Such a momentary concentration may damage portions of the snow floor 100 and, or interfere with the intended feel and sound of the snow floor 100 if the heel were allowed to directly contact the first disturbing agent layer 102, the second disturbing agent layer 103, and/or the confinement member 101. Furthermore, such contact may present a trip hazard.

To present an even top surface to users and to redistribute forces on the snow floor 100, the snow floor 100 may include a force distribution layer 104. The force distribution layer 104 may be disposed above the first disturbing agent layer 102 and the confinement member 101. The force distribution layer 104 may be relatively rigid to provide a uniform top surface. The force distribution layer 104 may be operable to redistribute relatively highly concentrated forces that may occur as users walk on the snow floor 100. For example, the force distribution layer 104 may be relatively stiff such that a concentrated application of force, such as the heel of a user described above, may be distributed over an area much wider than the area of the application of force. This effect may be similar to that of a person using snowshoes to distribute the weight of their footfalls as they walk across a snow covered surface. The force distribution layer 104 may also be operable to transmit the vibration and sound from the relative movement of the aggregate 202 to the user.

In a particular arrangement, the force distribution layer 104 may be a perforated polypropylene sheet. The perforations may allow relatively more sound to be transmitted through the force distribution layer 104 than may be possible if the force distribution layer 104 were not perforated. The perforations may, for example, encompass 25% of the surface area of the force distribution layer 104.

The top layer 105 may be disposed above the force distribution layer 104. The top layer 105 may be the only visible layer once the snow floor 100 is installed. The top layer 105 may also be the layer that users walking across the snow floor 100 come into contact with. The top layer 105 is generally an aesthetic layer that may be configured to provide a look that coincides with the sound and vibration profile achieved by the underlying layers. Accordingly, the top layer 105 used in the snow floor 100 may be white. The top layer 105 may be operable to allow the sound and vibration from the layers beneath it to pass through it and be communicated to the users. In a particular arrangement, the top layer 105 may be a durable white felt. Durable white felt may provide a surface that is visually similar to snow while also providing a surface that is durable and fit to be installed in areas that may experience a significant amount of foot traffic.

A padding layer 106 may be disposed below the second disturbing agent layer 103 and the confinement member 101. The padding layer 106 may provide a cushioning effect to the snow floor 100 for user comfort. In this regard, the padding layer 106 may serve a similar function as padding under a typical carpet and may be sized accordingly and be of an appropriate hardness. In a particular arrangement, the padding layer 106 may comprise rubber.

A base 107 may be disposed below the padding layer 106. The base 107 may provide support for the snow floor 100. The snow floor 100 including the base 107 may be manufactured to be installed as a complete unit (e.g., similar to a typical floor tile). In another embodiment, the base 107 may be an existing surface, such as an existing floor, and the other layers may be installed over the base 107. In the latter embodiment, the snow floor 100 (without the base 107) may be produced in sheets or rolls that may be laid out over an existing floor. In such an embodiment, the snow floor 100 (without the base 107) may be installed in a manner similar to how carpeting is generally installed. For example, the snow floor 100 (without the base 107) may be adhesively joined to the existing floor. In another example, the snow floor 100 (without the base 107) may be mechanically joined to the existing floor (e.g., with staples, tack strip, nails, and/or the like).

The snow floor 100 may be assembled and secured in a variety of ways. In one embodiment, the snow floor 100 may be in the form of tiles, with each tile including each of the layers 101 through 107 shown in FIG. 1. In such an embodiment, the layers may be fixedly interconnected about the perimeter of the tile. For example, staples or other appropriate fastening means may be driven through the top layer of 105 and the intervening layers and into the base layer 107. Within the interior portion of the tile (e.g., not along the perimeter) the individual layers may be adjacent to each other but not fixedly interconnected to each other. In this regard the layers may be able to move relative to each other. This relative movement may contribute to the ability of the various layers discussed above to function as described.

In another exemplary embodiment, the snow floor 100 (without the top layer 105) may be constructed by arranging a plurality of tiles in an area and then placing the top layer 105 over the plurality of tiles. In such an embodiment, each of the plurality of tiles may be configured as shown in FIG. 1 except without the top layer 105. After the plurality of tiles have been laid down in the area where the snow floor 100 is the installed, the top layer 105 to be laid over the plurality of tiles. This may, for example, be accomplished by unrolling a role of top layer 105 material and then securing the top layer 105 to the plurality of tiles to form the snow floor 100. The interconnection of the top layer 105 to the underlying plurality of tiles may be accomplished in any appropriate manner. For example, the top layer 105 may be joined with the plurality of tiles using an adhesive. The adhesive may be configured (e.g., viscosity, quantity) such that it does not plug the perforations of the force distribution layer 104. The adhesive may be a spray adhesive applied to the top layer 105 and/or force distribution layer 104 prior to installation. In another example, the top layer 105 may be joined with the plurality of the tiles using periodic mechanical fasteners such as staples.

As described above, multiple attributes of the various components and techniques used to construct the snow floor 100 may be varied to vary the feel and sound produced by the snow floor 100. For example, with respect to the confinement member 101, the cross sectional size of portions of the confinement member 101 (e.g., tube diameter), the thickness of the wall portions, the material of the confinement member 101, and the spacing between various sections of the confinement member 101, may all be varied to vary the feel and sound of the snow floor 100. With respect to the disturbing agent layers 102, 103, the mesh thickness, mesh spacing, and mesh hardness may all be varied to vary the feel and sound of the snow floor 100. The rigidity, thickness, and perforation size and pattern of the force distribution layer 104 may also be varied to vary the feel and sound of the snow floor 100. The thickness and density of the padding layer 106 may also be varied to vary the feel and sound of the snow floor 100. In addition, the methods used to assemble the snow floor 100 may also affect the look, feel, and sound of the snow floor 100.

In addition to or in place of varying the attributes of individual layers to achieve differing results, entire layers may be added and/or deleted relative to the configuration shown in FIG. 1 to tune the feel and sound of the flooring system. For example, relative to the configuration shown in FIG. 1, the first disturbing agent layer 102 may be eliminated. This may result in a snow floor that will achieve slightly less perceived crunch in reaction to a user walking across it as compared to the snow floor 100 as shown in FIG. 1. In a similar manner, the configurations of the flooring systems disclosed herein may be customized to achieve various sounds and feels. These may be used to simulate different surface and, or conditions.

EXAMPLE

A prototype section of snow floor 100 was produced and tested. The prototype section demonstrated that the look, feel and sound of walking across a surface made of snow could be simulated by a durable, low maintenance flooring system that does not require refrigeration. The prototype section measured approximately three feet by five feet. The confinement member 101 comprised high temperature silicone rubber tubing (½" ID, ⅝" OD), with a wall hardness of Shore A 70, laid out in a grid pattern and filled with plastic blasting media comprising 12-16 mesh polypropylene granules. Each tube was filled by pouring the plastic blasting media into a funnel attached to the tube. The plastic media was generally not forced into the tubing, thus enabling adequate movement of the aggregate within the tube in reaction to forces applied to the snow floor 100. The tubes 109 were laid out in a square grid, where each section of the grid was about four inches by four inches. The first and second disturbing agent layers 102, 103 comprised a polyethylene mesh. The opening size of the mesh was 1.56" wide by 1.56" long. The strands of the mesh were 0.150" high by 0.225" tall. The thickness of the strand joints was 0.200". The padding layer 106 comprised a 3/32" thick neoprene spring rubber. The padding layer 106 had a durometer hardness of 70A, a tensile strength of 1700 psi, a stretch limit of 200%, and a density of 96 lbs./cu. ft. The base 107 comprised a three feet by five feet sheet of plywood. The force distribution layer 104 comprised a 1/16" thick perforated polypropylene sheet. The perforations were approximately 3/32 inch in diameter with a 3/16 inch center-to-center spacing. The open area of the sheet was 25%. The top layer 105 comprised a durable white felt and was adhesively interconnected to the force distribution layer 104 using a spray adhesive. All of the layers were interconnected by a plurality of zip ties passing through each of the layers around the perimeter of the prototype section. The prototype section demonstrated that the snow floor 100 is capable of reproducing the look, feel, and sound of a natural snow covered surface. Furthermore, the prototype section demonstrated that the snow floor 100 may be comfortable and safe to walk across.

Figure 3:
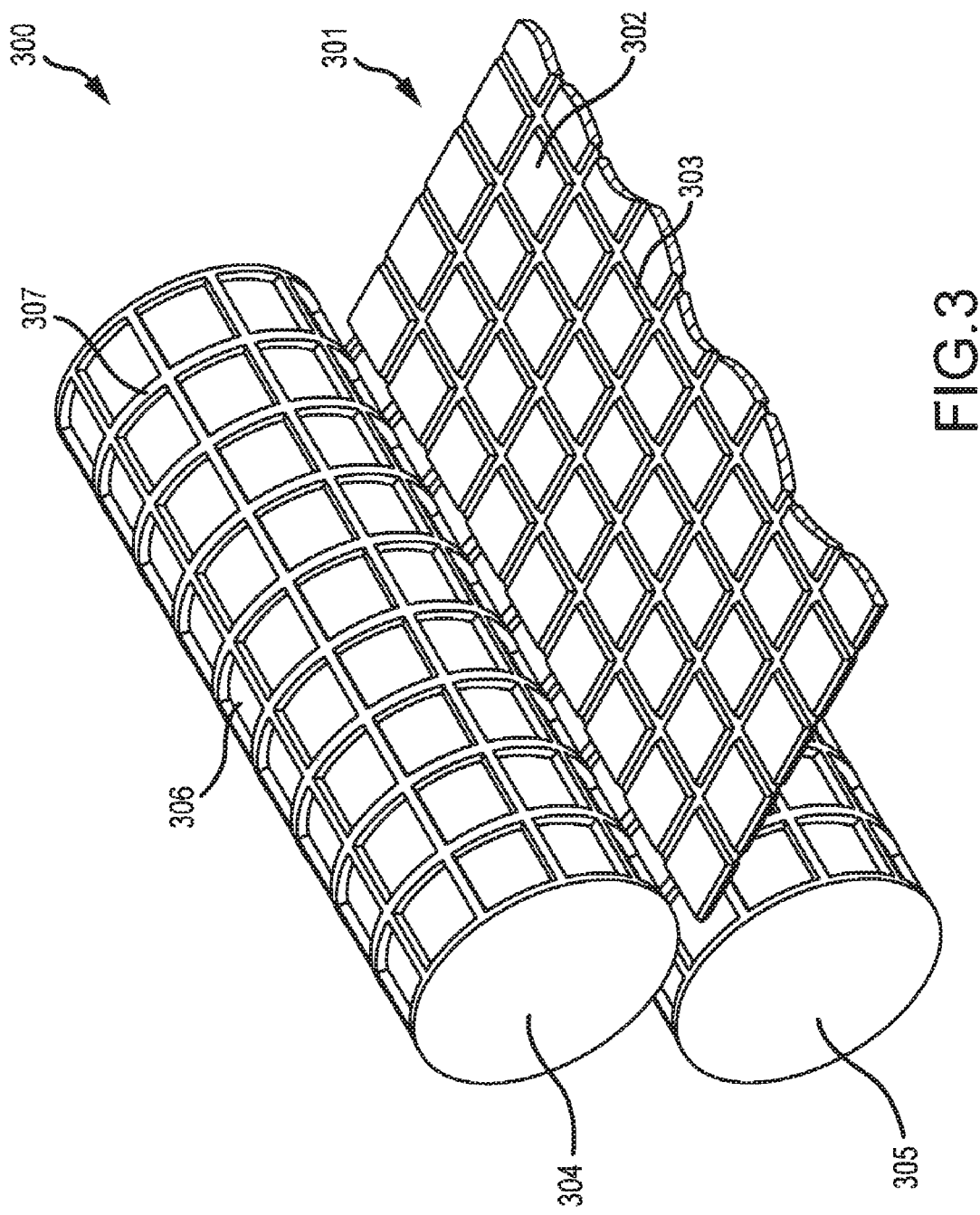
FIG. 3 illustrates an embodiment of a confinement member and a corresponding manufacturing system.

FIG. 3 illustrates an alternative configuration of a confinement member 301 and a system 300 for manufacturing such a confinement member 301. The confinement member 301 may include a plurality of individual cells 302. The cells 302 may each comprise a contained volume. Each contained volume may contain an aggregate. Each contained volume of each cell 302 may be substantially separated from every other contained volume of each cell 302 such that aggregate located within the contained volumes is incapable of moving between different contained volumes. The contained volumes may be separated from each other by sealed regions 303. The sealed regions 303 may, as illustrated in FIG. 3, comprise regularly spaced regions forming a square grid. The sealed regions 303 may together form a single continuous sealed region. Other patterns of sealed regions may be utilized. Such patterns may result in various shapes of cells, such as, for example, diamond shaped cells, rectangular cells, or circular cells. Such patterns may be uniform or non-uniform. In this regard, in a particular confinement member 301, the cells may vary in size and/or shape.

The confinement member 301 may be substituted for the confinement member 101 of the embodiment of FIG. 1, or may be used in any of the above-described embodiments. The confinement member 301 may function substantially the same as the confinement member 101 of FIG. 1. In this regard, the confinement member 301 may allow an aggregate within it to move in reaction to a force applied to the flooring system. This movement may produce a sound and feel similar to that of walking on snow or other surfaces. The parameters of the confinement member 301 (e.g., cell 302 size and shape, amount of aggregate within each cell 302, etc.) may be varied to produce different qualities (e.g., sound and feel) of the flooring system in which it is incorporated.

The sealed regions 303 may be formed by attaching opposing layers of material (e.g., polypropylene sheets) to each other. An aggregate may be disposed between the sheets prior to attaching to each other. In this regard, the aggregate may be captured between the sheets after the sheets are attached to each other. The sheets may be adhesively attached, heat welded together, ultrasonically welded together, or attached by any other appropriate means or combination of means. The attaching process may result in a portion of the aggregate being fixedly trapped between the sheets in the sealed regions 303. The remaining portion of the aggregate may be distributed within the various individual cells 302 of the confinement member 301.

The system 300 for manufacturing the confinement member 301 may include corresponding rollers such as upper roller 304 and lower roller 305. The rollers 304, 305 may be configured with depressions 306 that correspond to the desired cells 302 of the confinement member 301. The rollers 304, 305 may also include raised areas 307 that may correspond to the sealed regions 303 of the confinement member 301. To produce a confinement member 301, two sheets of material with an aggregate disposed between them may be fed between the rollers 304, 305. The rollers 304, 305 may be heated such that when portions (e.g., the raised areas 307) of the upper roller 304 and lower roller 305 come into contact with the sheets, the sheets are heat welded together in the pattern corresponding to the raised portions of the rollers 304, 305. In this regard, the upper roller 304 and the lower roller 305 may be used to produce the confinement member 301 of FIG. 3. In an alternative configuration of the system 300, only a single roller, such as upper roller 304 may be present. In such a system, the two sheets of material with the aggregate disposed between them may be sandwiched between the upper roller 304 and another surface (e.g., a flat surface or a smooth roller). In such a system, the entire pattern of cells and sealed regions may be produced by the corresponding pattern on the single upper roller 304. Also, in a particular system 300 for manufacturing the confinement member 301, the process may be performed in stages where the two sheets of material with the aggregate disposed between them are sequentially passed through a plurality of rollers or sets of rollers to produce the confinement member 301.

In another embodiment a method of simulating the reaction of snow to a step of a user is provided. The method may include the first step of providing a white top layer of a flooring system. The white top layer may give a flooring system the appearance of snow. The next step may be to receive the step of the user on the flooring system where the step of the user comes into contact with the flooring system in a first contact area. The flooring system may be located in any appropriate area such as, for example, at an attraction where it is desired to simulate the look, feel and sound of a snow covered surface.

The next step may be to redistribute a force applied to the flooring system by the user as a result of the received step over an area larger than that of the first contact area. This may, for example, be achieved by a rigid intermediate layer below the white top layer. Another step may be to communicate the redistributed force to a plurality of discrete locations within a confinement member. The confinement member may be disposed below the rigid intermediate layer. The redistribution may be achieved by a disturbing agent layer that intermittently contacts both the rigid intermediate layer and the confinement member. The disturbing agent layer may, for example, comprise a mesh of material.

Another step may be a repositioning step where an aggregate confined within the confinement member is repositioned as a result of the communicated force. The repositioning may include relative movement of individual components of the aggregate relative to other individual components of the aggregate. This relative movement may produce sound and vibration that are then transmitted to the user. The transmitted sound and vibration may simulate the sound and vibration of walking on snow and thereby give the impression to the user of walking on snow.

Although the above-described method has been described in terms of simulating walking on snow, sensations of walking across other surfaces may be simulated using similar methods. For example, an embodiment may include providing a tan, sand-colored top layer and configuring the flooring system to simulate the feel and sound of walking on sand, thus providing to a user the look, feel and sound of walking across sand.

I claim:

1. A flooring system comprising:
   a volume of an aggregate comprising a plurality of granules;
   a confinement member operable to confine said aggregate therein; and
   a force distribution layer extending over the confinement member, the force distribution layer comprising a perforated sheet of material transmitting sound generated when the granules rub against each other in the confinement member.

2. The flooring system of claim 1, wherein said aggregate comprises plastic blasting media.

3. The flooring system of claim 2, wherein said plastic blasting media comprises 12-16 mesh polypropylene granules.

4. The flooring system of claim 1, wherein said confinement member comprises a plurality of tubes, wherein said aggregate is confined within said plurality of tubes.

5. The flooring system of claim 1, further comprising a continuous layer comprising durable white felt over the force distribution layer.

6. The flooring system of claim 1, further comprising a disturbing agent layer interposed between the force distribution layer and the confinement member, wherein said disturbing agent layer is operable to cause portions of said aggregate to move relative to other portions of said aggregate in reaction to a force applied to said flooring system.

7. The flooring system of claim 1, further comprising a first disturbing agent layer interposed between the force distribution layer and the confinement member, wherein said first disturbing agent layer is operable to communicate a force applied to said flooring system over a predetermined area to said confinement member at a plurality of discrete locations.

8. The flooring system of claim 1, wherein the perforated sheet of the force distribution layer has a surface area with at least about 25 percent perforations.

9. The flooring system of claim 8, wherein the perforated sheet comprises a rigid sheet of a thermoplastic polymer, whereby forces applied to an area of the perforated sheet are distributed to an area of the confinement member greater than the perforated sheet area to which the forces are applied.

10. A flooring system comprising:
    a first layer comprising an aggregate and a confinement member, wherein said confinement member is operable to confine said aggregate therein; and
    a second layer interconnected to said confinement member, wherein said confinement member comprises a plurality of tubes, wherein said aggregate is confined within said plurality of tubes, and wherein said tubes comprise silicone.

11. A flooring system comprising:
    a first layer comprising an aggregate and a confinement member, wherein said confinement member is operable to confine said aggregate therein; and
    a second layer interconnected to said confinement member, wherein said second layer is a first disturbing agent layer,
    wherein said first disturbing agent layer is operable to communicate a force applied to said flooring system over a predetermined area to said confinement member at a plurality of discrete locations, and
    wherein said first disturbing agent layer is a mesh.

12. The flooring system of claim 11, wherein said first disturbing agent layer comprises polypropylene.

13. A flooring system comprising:
    a first layer comprising an aggregate and a confinement member, wherein said confinement member is operable to confine said aggregate therein;
    a second layer interconnected to said confinement member; and
    an outer layer,
    wherein said second layer is a first disturbing agent layer,
    wherein said first disturbing agent layer is operable to communicate a force applied to said flooring system over a predetermined area to said confinement member at a plurality of discrete locations, and
    wherein said first disturbing agent layer is disposed between said confinement member and said outer layer.

14. The flooring system of claim 13, further comprising a force distribution layer, wherein said force distribution layer is disposed between said outer layer and said first disturbing agent layer, wherein said force distribution layer is substantially flat, wherein said force distribution layer is operable to distribute said force applied to said flooring system over a predetermined area to an area of said first disturbing agent layer larger than said predetermined area.

15. The flooring system of claim 14, wherein said force distribution layer is perforated.

16. A flooring system comprising:
    a first layer comprising an aggregate and a confinement member, wherein said confinement member is operable to confine said aggregate therein;
    a second layer interconnected to said confinement member, wherein said second layer is a first disturbing agent layer and wherein said first disturbing agent layer is operable to communicate a force applied to said flooring system over a predetermined area to said confinement member at a plurality of discrete locations;

an outer layer, wherein said first disturbing agent layer is disposed between said confinement member and said outer layer; and a second disturbing agent layer, wherein said second disturbing agent layer is operable to communicate a force applied to said flooring system over a predetermined area to said confinement member at a plurality of discrete locations, wherein said first and second disturbing agent layers are meshes, and wherein said second disturbing agent layer is disposed on a side of said confinement member opposite from said first disturbing agent layer.

17. The flooring system of claim 16, further comprising:

a force distribution layer, wherein said force distribution layer is disposed between said outer layer and said first disturbing agent layer, wherein said force distribution layer is substantially flat, wherein said force distribution layer is operable to distribute said force applied to said flooring system over a predetermined area to an area of said first disturbing agent layer larger than said predetermined area; and a padding layer disposed on a side of said second disturbing agent layer opposite from said confinement member.

18. The flooring system of claim 17, further comprising a rigid base layer disposed on a side of said padding layer opposite from said second disturbing agent layer.

19. The flooring system of claim 17, wherein said force distribution layer comprises polypropylene.

20. The flooring system of claim 17, wherein said padding layer comprises high-density foam rubber.

21. A flooring system comprising:

an aggregate comprising 12-16 mesh polypropylene granules;

a confinement member comprising a plurality of tubes, wherein said aggregate is confined within said plurality of tubes;

a continuous outer layer interconnected to said confinement member;

a first disturbing agent layer, wherein said first disturbing agent layer is operable to communicate a force applied to said flooring system to said confinement member at a plurality of discrete locations, wherein said first disturbing agent layer is disposed between said confinement member and said outer layer;

a second disturbing agent layer, wherein said second disturbing agent layer is operable to communicate said force applied to said flooring system to said confinement member at a plurality of discrete locations, wherein said first and second disturbing agent layers are meshes, wherein said second disturbing agent layer is disposed on a side of said confinement member opposite from said first disturbing agent layer;

a force distribution layer, wherein said force distribution layer is disposed between said outer layer and said first disturbing agent layer; wherein said force distribution layer is substantially flat, wherein said force distribution layer is operable to distribute said force applied to said flooring system over said first disturbing agent layer; and a padding layer disposed on a side of said second disturbing agent layer opposite from said confinement member.

* * * * *